Jan. 12, 1943.  R. H. NISBET ET AL  2,307,788
MEANS FOR CONTROLLING THE DIRECTION OF THE AXIS OF GYROSCOPES
Filed April 1, 1941  5 Sheets-Sheet 1

Jan. 12, 1943.   R. H. NISBET ET AL   2,307,788
MEANS FOR CONTROLLING THE DIRECTION OF THE AXIS OF GYROSCOPES
Filed April 1, 1941   5 Sheets-Sheet 2
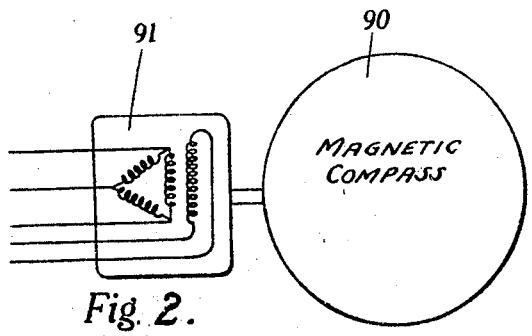
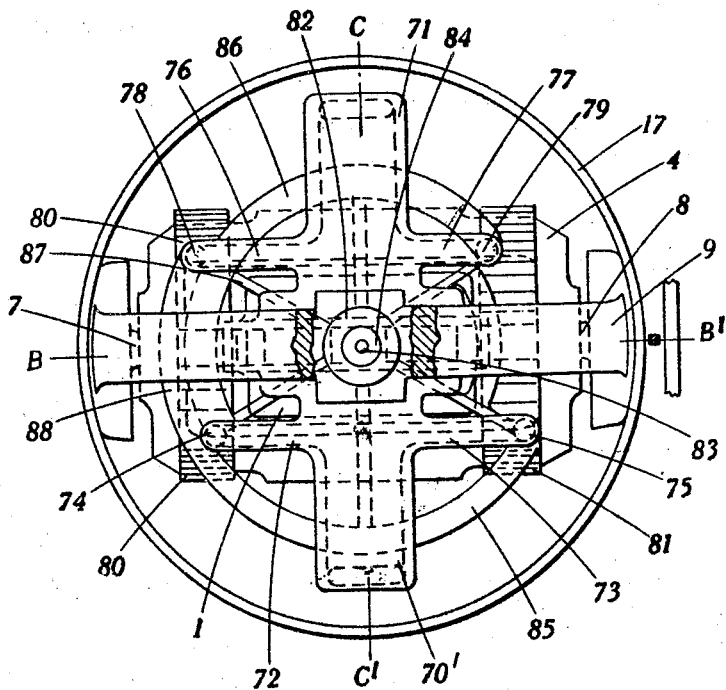

Jan. 12, 1943.    R. H. NISBET ET AL    2,307,788
MEANS FOR CONTROLLING THE DIRECTION OF THE AXIS OF GYROSCOPES
Filed April 1, 1941    5 Sheets-Sheet 3

Jan. 12, 1943.    R. H. NISBET ET AL    2,307,788
MEANS FOR CONTROLLING THE DIRECTION OF THE AXIS OF GYROSCOPES
Filed April 1, 1941    5 Sheets-Sheet 4

INVENTORS
R. H. Nisbet and
W. J. Harding
Herbert H. Thompson
their ATTORNEY.

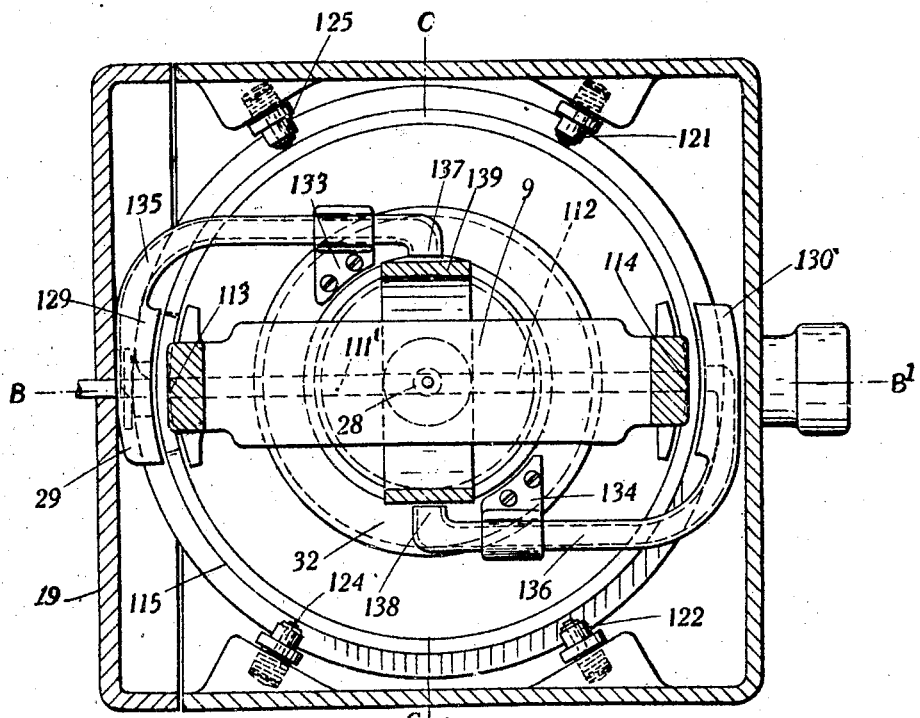
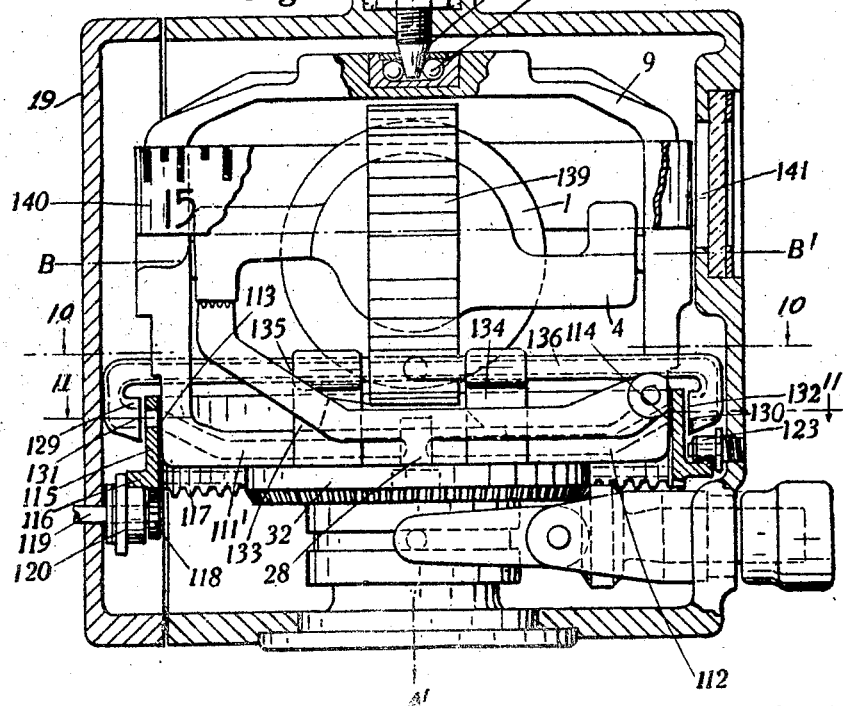

Patented Jan. 12, 1943

2,307,788

UNITED STATES PATENT OFFICE 2,307,788

MEANS FOR CONTROLLING THE DIRECTION OF THE AXES OF GYROSCOPES

Robert Hayes Nisbet, Stroud, and William George Harding, Whitton, England, assignors to Sperry Gyroscope Company Incorporated, Brooklyn, N. Y., a corporation of New York Application April 1, 1941, Serial No. 386,286
In Great Britain January 25, 1940

6 Claims. (Cl. 33—204)

The present invention relates to gyroscopic apparatus and more particularly to gyroscopic devices such as those employed as gyroscopic indicating instruments, or as control instruments for automatic pilots, for aircraft and other navigable vehicles.

The present invention is concerned with means for controlling a gyroscope to precess about its secondary axis of sensitivity, i. e., in normal constructions, the outer precession axis, to follow a controlling member. The invention is more particularly applicable to the control of an azimuth gyroscope, or so-called directional gyroscope, to cause the gyroscope to precess about its secondary (vertical) axis so as to take up a position of alignment with a controlling member also capable of rotation about the same secondary (vertical) axis.

According to the present invention means are provided for precessing a gyroscope to follow a controlling member which is mounted for rotation about the secondary axis of sensitivity of the gyroscope, said means comprising baffle means which are adapted to intercept or divert a continuously acting air jet or jets to an extent depending on the relative angular position of the gyroscope and the controlling member, and thus to vary the resultant torque imparted to the gyroscope by said air jet or jets about the primary axis of sensitivity of the gyroscope, said torque being zero in the normal relative position of the gyroscope and the controlling member, and varying in sense according to the direction in which the gyroscope and the controlling member are relatively displaced from this normal position.

In some forms of the present invention the baffle means may be attached to the rotor-bearing frame, and the torque delivered to the gyroscope by the jets is then due to the forces directly imparted to the baffle means by the air jets. The baffle means are in the form of a part-circular member attached to the rotor-bearing frame of the gyroscope in the plane containing the rotor axis and the primary precession axis, i. e., in the plane of the rotor-bearing frame. The member is serrated on its outer surface and the jets are so directed against the serrations that, in the position of alignment of the gyroscope with the controlling member, the force exerted by each jet on the member applies a torque to the rotor-bearing frame about its primary axis, and the jets are so disposed around the secondary axis that, in the said position of alignment, the torques about the primary axis of the gyroscope resulting from the action of the jets on the serrated member are balanced, so that, if the gyroscope departs from this position of alignment in either direction, these torques become unbalanced, and the unbalanced torque thus produced acts to cause precession of the gyroscope about its secondary axis back towards the position of alignment with the controlling member. Preferably, the part-circular serrated member is a semi-circular member whose diametral base is in the plane containing the rotor axis and the primary precession axis of the gyroscope.

In other forms of the invention the air jet or jets apply a torque to the rotor-bearing frame by impinging against a structure connected to the rotor-bearing frame other than the baffle means themselves, and the baffle means variably control the extent to which the jets strike said other structure, which they do either by variably intercepting the jets directed towards said structure or by variably diverting the jets to or from said structure.

It is desirable to arrange that the full torque that the air jet or jets can deliver to the gyroscope is exerted whenever the angular displacement of the gyroscope from its normal position relative to the controlling member reaches or exceeds a threshold value that is quite small, preferably of the order of two or three degrees. This can be arranged by ensuring that the jets occupy only a small angle round the secondary axis of sensitivity of the gyroscope, so that, when a relative displacement occurs, the jet or jets adapted to be further intercepted or diverted as a result of this displacement are fully intercepted or diverted and, similarly, that the jet or jets adapted to be less intercepted or diverted are left completely free, as soon as the relative displacement reaches the threshold value corresponding to this small angle.

The present invention is particularly applicable to the control of the direction of the axis of a directional gyroscope so as to cause this to follow the movements of a controlling member, which may be positioned by the repeater of a magnetic compass provided with a remote transmission system. In this way the controlling member remains on the average in a constant direction, but is subject to fairly rapid oscillations corresponding to those of the magnetic compass. The gyroscope cannot follow these rapid oscillations, as it precesses only slowly, and its settled position therefore corresponds to the average position of the magnetic compass, intrinsic wandering of the gyroscope being prevented by the control exerted by the magnetic compass repeater.

In order that the present invention may be more clearly understood and readily carried into effect several embodiments of the invention illustrated by way of example in the accompanying drawings will now be described in detail. In the accompanying drawings:

Fig. 1 is a side elevation partly in section of one form of the invention as applied to a type of directional gyroscope for use on aircraft which is provided with means for controlling the steering of the craft. The plane of section is through the centre of the face of the instrument, i. e., fore-and-aft, the gyroscope being so oriented that the rotor is seen face on. In this figure a precession controlling member is illustrated and means for controlling this controlling member from a magnetic compass are shown diagrammatically:

Fig. 2 shows a compass and transmitter connected therewith for controlling the slave gyroscope of Fig. 1.

Fig. 3 is a sectional plan view of the apparatus of Fig. 1 taken on the line 3—3 of Fig. 1:

Fig. 4 is a sectional elevation of another form of the invention using a baffle that controls the gyroscope by deflecting air jets; in this case the plane of section is fore-and-aft as in Fig. 1, the gyroscope being oriented so that the rotor is seen edge on:

Fig. 9 is a part-sectional elevation on a fore-and-aft plane of a third form of the invention, the gyroscope being so oriented that the rotor is seen face on:

Fig. 10 is a sectional plan of the instrument of Fig. 9 taken on the line 10—10 of Fig. 9, omitting, however, for clarity, the rotor, and the caging arm for the rotor-bearing frame:

Figure 1:
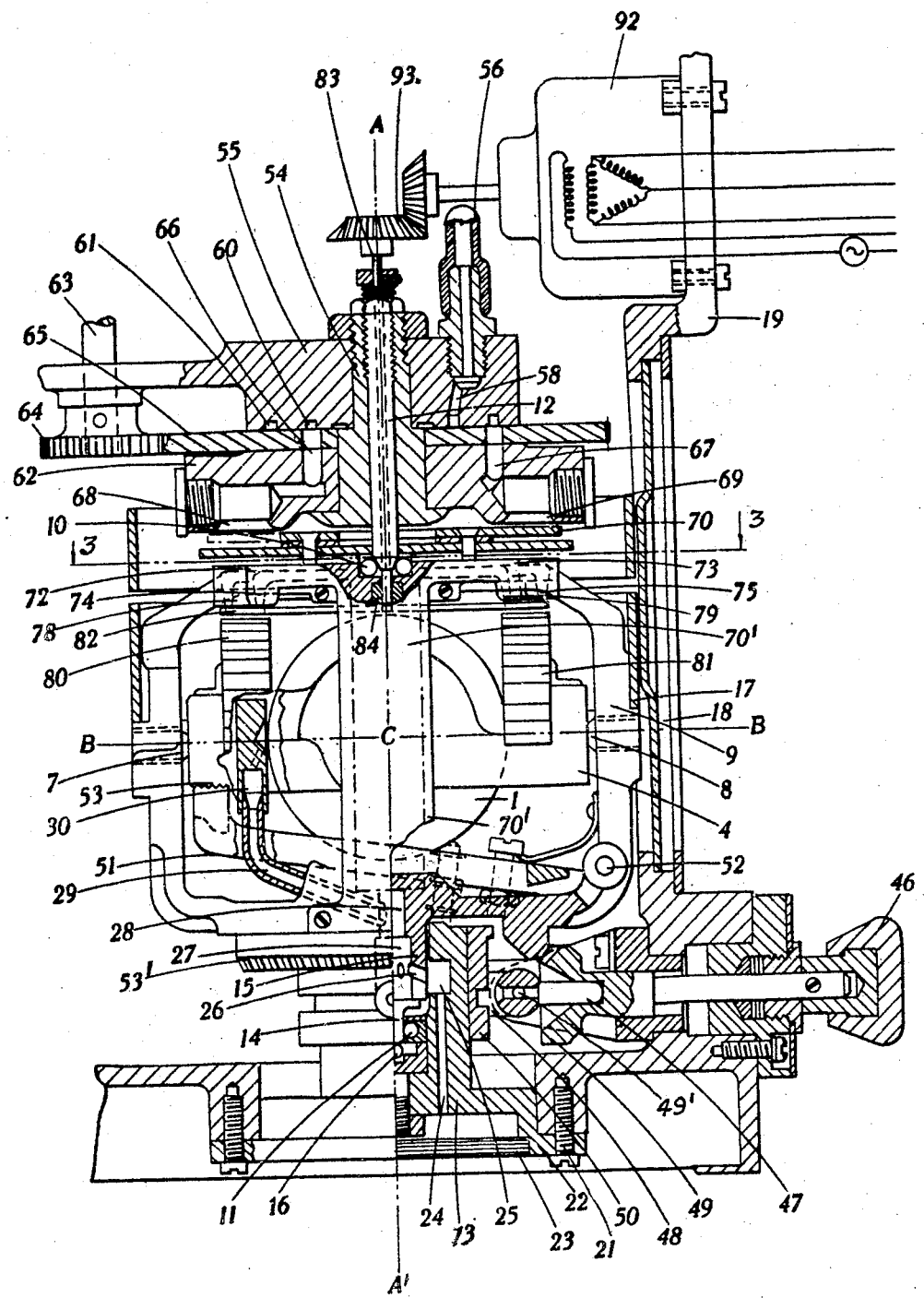

Referring to the drawings, all of which illustrate the invention as applied to the control of a directional gyroscope about its vertical axis, 1 is the rotor of the directional gyroscope, which is carried in bearings 2, 3 in a rotor-bearing frame 4, which is itself supported in bearings on pivots 7, 8 carried in a vertical ring 9. The vertical ring 9 turns about a vertical axis AA' defined by upper and lower bearings 10 and 11. The upper bearing 10 is housed in the vertical ring 9 and engages with a fixed pivot pin 12 while the lower bearing 11 is housed in a cylindrical bearing housing 13 and engages with a vertical pivot pin 14 extending downwards from a boss 15 which is solid with the vertical ring 9. The pivot pin 14 rests on a ball 16 which acts as a thrust bearing. Attached to the vertical ring 9 is a cylindrical compass card 17 on which the heading of the craft can be read through a window 18 in the instrument casing 19. The fixed pivot 12 is fixed in a bracket 55 rigid with the instrument casing 19 and the cylindrical lower bearing housing 13 is secured inside a hole in the base of the casing 19 by screws 21 passing through a flange 22 forming part of the housing 13.

The gyroscopes ilustrated are of the air-driven type, the casing 19 being therefore airtight except for one air exit and a limited number of air entries. The air exit (not shown) is connected to a source of negative air pressure such as a suction pump or a Venturi tube which creates a low pressure inside the instrument casing and thus cases air to flow in through all the entry points provided. The main air entry, (which is shown covered by a filter 23 in Fig. 1) is through channels 24 leading into an inner space 25 in the bearing housing 13. The boss 15 of the vertical ring 9 fits into the neck of the housing 13 with a very small but definite clearance thus ensuring that very little of the air entering space 25 by channels 24 escapes from this space through the neck of the housing into the interior of the insrument.

The boss 15 is hollow and passages 26 are provided in its wall through which air from space 25 passes into the space 27 in the interior of the boss 15. The space 27 is in communication through passages 28, 29 with the interior of the nozzles 30 from which the air issues at high velocity in a direction to strike tangentially the periphery of the rotor 1 causing the latter to rotate at a high speed, the rotor being provided with turbine buckets for this purpose. The air driving means are described more fully in U. S. Patent No. 1,982,637 to B. G. Carlson, dated December 4, 1934, for Directional gyroscope.

When the gyroscope is freed and the rotor is running, the axis of the rotor remains constant in direction or changes direction only slowly. Thus deviations of the craft from a desired heading can be detected by watching the compass card 17. However, the gyroscope is apt to change direction slowly as the result of extraneous torques, such as a gravity couple due to slight unbalance, or to frictional couples in the bearings, and such changes of direction are in general continuous, thus leading in time to large errors. For this reason a directional gyroscope cannot replace an absolute direction-giving compass. A number of proposals have therefore been made to control such a directional gyroscope to move always towards a position of alignment with a controlling body, which may be a direction-giving instrument such as a magnetic or radio compass, or may be a member positioned from, or otherwise controlled from, a direction-giving instrument. The gyroscope then takes up a direction corresponding to the mean direction of the direction-giving instrument and thus itself becomes a direction-giving instrument having the additional advantage of stability of direction during quick-period yawing or turning of the craft.

The present invention when applied to directional gyroscopes provides a system of this nature in which a controlling member is mounted for rotation about the vertical axis of the gyroscope and exerts or controls air jet torques to act on the gyroscope to precess it round the vertical axis towards a predetermined position of alignment with the controlling body.

The gyroscope is shown as being caged and reset by the usual form of caging knob. In Fig. 1 knob 46 is shown as pushed in to lock the gyroscope and cut the gyroscope for resetting.

As is described more fully in U. S. Patent No.

1,974,220 to E. A. Sperry, Jr., dated September 18, 1934, for Direction indicators, this has the effect of bringing the arm 47 of a forked lever 48 into the centre of a conical axial hollow in a bevel gear 49 carried at the inner end of the shaft of knob 46, thereby causing the lever 48 to tilt about its pivot 49' and to raise the sleeve 50 surrounding the cylindrical lower bearing housing 13, this upward movement of the sleeve 50 in turn actuating mechanism causing the caging arm 51 to tilt upwards about its pivotal axis 52 into the position shown in Fig. 1. In this position the surface 53 at the free end of the arm 51 comes into contact with a corresponding plane surface on the underside of the rotor-bearing ring 4, and forces the latter into a plane perpendicular to the plane of the vertical ring 9. Also, when the caging knob 46 is pushed in, the teeth of bevel gear 49 come into engagement with the teeth of gear 53', which is secured to the vertical ring 9. The operator is then able to turn the gyroscope about the vertical axis AA' by turning knob 46.

In the operating position of the gyroscope, the knob 46 is pulled out, whereupon the sleeve 50 descends and the casing arm 51 drops, leaving the rotor-bearing ring 4 free to pivot about the horizontal axis BB'.

In this form of directional gyroscope the upper pivot pin is secured not into the top of the instrument case but into a bushing 54, which is itself screwed into a plate or bracket 55, which is solid with the instrument case. Also additional air inlets are provided through two pipe connections passing through the casing wall and leading to channels in the bracket 55. Only one of these pipes, 56, leading to channel 58 is shown; the other pipe does not appear in Fig. 1, but it leads to a channel (not shown) similar to channel 58. Channel 58 puts pipe 56 into communication with a circular groove 60 cut in the underside of the bracket 55. Similarly the other pipe is put into communication by the channel corresponding to channel 58 with a second circular groove 61 concentric with the groove 60.

Immediately below and close against the bracket 55, a member 62 is mounted with freedom to rotate round the vertical axis AA' on the bushing 54 as journal. The angular position of the member 62 is controlled by shaft 63 to which is attached a pinion 64 in gearing engagement with a gear wheel 65 which is rigidly attached to the member 62. Air channels 66, 67 through the gear 65 and member 62 put the circular channels 60, 61 respectively into communication with ports 68, 69 which have the form of narrow rectangular slots in the underside of the member 62.

Attached to the vertical ring 9 of the gyroscope is a semi-circular cut-off disc 70, whose radius is greater than the radial distance of the extreme outer edges of the ports 68, 69 from the axis AA'.

In the normal operating position the straight diametral edge of the semi-circular cut-off disc 70 covers one-half of each of the ports 68, 69, with the result that the flow of air through the two ports is equally restricted.

In operation, when the caging arm 51 is dropped and the rotor 1 is spinning, the spin axis CC' remains constant in direction, or at most changes direction slowly. If the craft yaws, the ports 68, 69 turn with the craft, and therefore one of the ports 68, 69 is uncovered to a greater extent than normally, while the other is covered to a greater extent than normally. The rates of flow of air through the pipe 56 and its companion are therefore varied in opposite senses, and a difference of pressure of the air in the pipes is created. A relay device external to the instrument is connected to the pipe 56 and its companion, so as to be responsive to this difference of pressure, and this device is arranged to control the aircraft's rudder, thus causing the craft to turn in the direction to restore alignment of the ports 68, 69 with the diametral base of the cut-off plate 70. One method of carrying out control of the rudder from the difference of pressure in pipe 56 and its companion is described in detail in U. S. Patent No. 1,992,970 to E. A. Sperry, Jr., B. G. Carlson and M. F. Bates, dated March 5, 1935, for Hydro-pneumatic automatic pilots.

In this form of the invention the holes from which issue the jets that apply torques to the gyroscope are carried by structures rigidly attached to the vertical ring 9. Two of these structures 70', 71 are secured to the ring 9, one on each side. Each is in the form of a U-shaped casting, the two arms of which are secured to the top and bottom of the vertical ring 9. The castings are hollow and the passages in their interiors are in communication with the space 28' in the interior of the vertical ring 9. Near the top of the vertical ring, branch tubes 72, 73 diverge from the U-shaped structure 70' to run parallel to the plane of the vertical ring 9; these tubes 72, 73 terminate in downwardly directed nozzles 74, 75. Similarly, branch tubes 76, 77 diverge from structure 71 and terminate in downwardly directed nozzles 78, 79. Nozzles 74, 79 are symmetrically disposed with respect to the vertical axis AA'; nozzles 75, 78 are also symmetrically disposed with respect to this axis but are at a slightly greater distance from it than are the nozzles 74, 79.

Owing to the reduced pressure inside the instrument case, air flows from the space 28' in the vertical ring 9 through the hollow structures 70', 71 to emerge as high velocity jets from the nozzles 74, 75, 78, 79. Jets 74, 78 are directed to play on a vertical turbine wheel 80, which is secured to the rotor-bearing frame 4, the jets being arranged to deliver equal and opposite torques to the wheel, and therefore to the rotor-bearing frame 9, about the axis BB' of the latter.

A second vertical turbine wheel 81 is attached to the rotor-bearing frame 4, the wheels 80, 81 being arranged symmetrically with respect to the vertical axis AA', and the jets 75, 79 are so directed to play on it as to deliver equal and opposite torques to the rotor-bearing frame 9 about the axis BB'.

The baffle 82 of the present invention is arranged to intercept the jets issuing from the nozzles 74, 75, 78, 79 to a variable extent before they strike the turbines 80, 81. The baffle 82 is mounted on a pivot pin 83 of small diameter which passes down the centre of the pivot pin 12 and is rotatable therein. At the lower end the pin 83 is secured into a boss 84 at the centre of the baffle. The baffle turns in a horizontal plane just below the nozzle orifices 74, 75, 78, 79, and the nozzles 75, 78 therefore define an annular region in the plane of the baffle opposite to them as the baffle turns round its axis AA'. The baffle has a solid portion 85 extending throughout 180° of this annular region, the remaining 180° being missing or cut away. The nozzles 74, 79 define another annular region of the baffle inside the first one, and, here again, the baffle comprises a solid portion 86 extending through 180° of this annular region while the remaining 180° is vacant except for narrow ribs 87 which extend across it to support the parts 85, 86 from the central boss 84. The parts 85, 86 overlap at 88 by an arc corresponding to the angular separation between the nozzles 75, 79.

In the normal operating position the ends of the part 85 interrupt one-half of each of the jets 75, 78, and, in consequence, the ends of the part 86 interrupt one-half of each of the jets 74, 79. As the jets 74, 79 are equal and symmetrically arranged, and as the jets 75 and 78 are also equal and symmetrically arranged, the forces applied to the turbine wheels are then completely balanced and no precession takes place. However, if the baffle 82 turns clockwise relatively to the gyroscope, jets 79 and 78 are further interrupted by the baffle while jets 74 and 75 are further uncovered. The forces delivered by the jets on the turbine wheels 80, 81 therefore apply an unbalanced torque about the axis BB', thus causing the gyroscope to precess clockwise round the axis AA' towards its normal position relative to the baffle 82. The force delivered by the jet 74 and the reaction of the air deflected from the turbine 81 after impact also applies a clockwise torque about the vertical axis AA'; however, the jet 75 similarly applies a counter-clockwise torque about the vertical axis; the jets 74 and 75 are so proportioned and their points of impact on the turbine wheels 80, 81 so arranged that these torques are substantially balanced; there is thus no resultant torque about the vertical axis and therefore no precession of the rotor axis in a vertical plane. It will be clear that, if a counter-clockwise rotation of the baffle 82 were to take place, the converse of the action described above would take place, jets 79 and 78 being uncovered and jets 74, 75 covered, with the result that the gyroscope would precess anti-clockwise to follow the baffle.

Figs. 1 and 2, together, illustrate diagrammatically the method by which the controlling baffle 82 may itself be controlled. In Fig. 2 90 denotes a magnetic compass and 91 denotes a transmitter for transmitting the azimuth movements of the compass relative to the craft. Magnetic compasses provided with transmission systems suitable for use in the arrangement shown are well known and do not form part of the present invention. They are therefore not described in detail here: reference is made, however, by way of example to United States Patent No. 2,003,270, in which suitable systems are described. The transmitter 91 is electrically connected to the receiver 92 to position the latter. Any type of transmission system may be used, but an A. C. self-synchronous type is shown in Figs. 1 and 2. The receiver 92 is geared by gearing, illustrated diagrammatically by bevel gears 93, to turn the shaft 83, and therefore the baffle 82, through one revolution relative to the craft for one revolution of the magnetic compass relative to the craft.

In the system of Fig. 1 the full value of the precessional torque is applied as soon as the gyroscope departs from its normal position of alignment with the controlling member 82 by more than a few degrees (i. e., sufficient for the baffle to uncover one jet completely and cover another). This arrangement has the advantage that whatever further angle is turned through by the gyroscope up to within a few degrees of 180°, the precessional torque remains at this maximum value.

Instead of using a transmission system such as the system 90, 91 of Figs. 1 and 2 to turn the controlling member 82, it is possible to adopt an arrangement in which, when the craft is turned from a normal heading relative to the magnetic compass, the magnetic compass sets a servo-motor into operation which is connected to the controlling member 82 and thus turns it continuously. For this purpose an arrangement such as that shown in U. S. Patent No. 2,177,242, to B. G. Carlson, dated October 24, 1939, for Aircraft automatic pilot, may be used for setting a servo-motor corresponding to the servo-motor 67 of that specification into operation, this servo-motor, however, being employed to turn the controlling member 82 of the present invention. In such an arrangement, provided that the craft is steered either manually or automatically in accordance with the heading defined by directional gyroscope, any wandering of the gyroscope results in a turning of the craft relative to the magnetic compass; this sets the servo-motor into operation to turn the controlling member 82 at the gyroscope slowly in the opposite direction, as a consequence of which a precessional torque is applied to the gyroscope to correct the wander. Thus in either case the gyroscope is prevented from wandering and therefore acts as an absolute direction-giving instrument.

Figure 4:
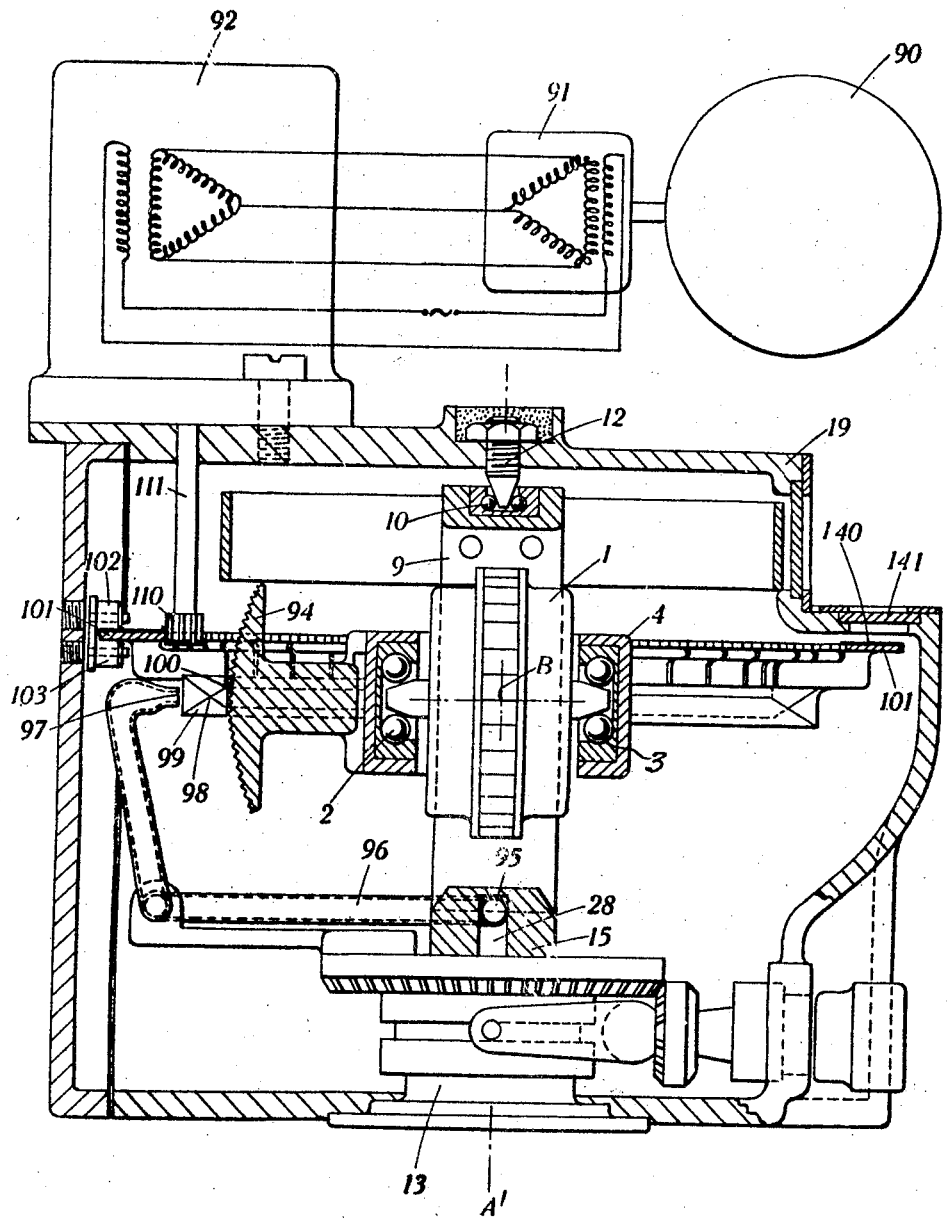
Figure 6:
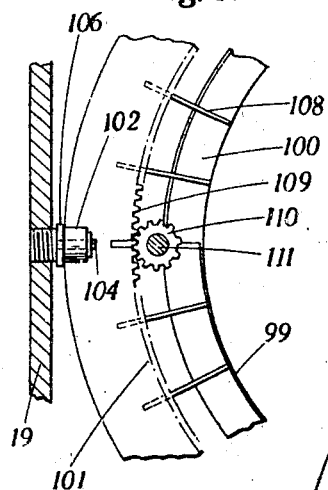
Fig. 6 is a plan view of part of the deflecting baffle and driving gear of Fig. 4.
Figure 7:
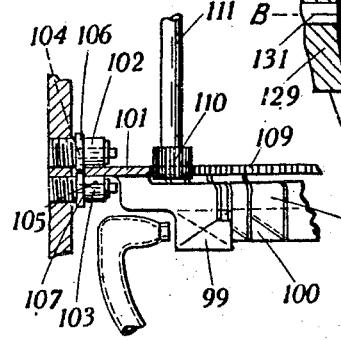
Fig. 7 is a side elevation of a modified form of deflecting baffle and of the co-operating nozzle, suitable for use in an arrangement otherwise similar to Fig. 4.

In the directional gyroscope shown in Figs. 4, 6 and 7 there is attached to one side of the rotor-bearing frame 4 a segment 94 of a turbine wheel co-axial with the axis BB' of support of the rotor-bearing frame 4 shown in Fig. 3. The turbine wheel may be formed with vanes lying in successive radial planes, or, as shown, with serrations on the surface of the segment 94. A passage 95 in the lower part of the vertical ring puts the channel 28 into communication with a tube 96 which leads to a nozzle 97 whose opening is opposite the segment 94. Owing to the reduced pressure in the interior of the instrument, air issues from the nozzle 97 at high velocity in the form of a jet directed normally against the face of the segment 94.

Between the nozzle 97 and the segment 94 there moves a baffle 98 of the deviating type, or chute. This is an asymmetrical ring structure lying in a horizontal plane and coaxial with the vertical axis AA'; it is formed of two semi-circular parts 99 and 100 having opposite characteristics. Part 99 is in the form of one half of a shallow zone cut from a conical surface converging upwards, whereas part 100 is in the form of one half of a shallow zone cut from a conical surface converging downwards; part 100 is therefore identical with part 99 inverted. Both parts 99 and 100 are supported from an annular member 101, which in turn is supported between a number of pairs of rollers such as 102, 103 mounted on pivot pins 104, 105 fixed in the instrument casing 19. The rollers act as thrust bearings for the annular member 101 and flanges 106, 107 on the rollers act as radial bearings for it, so that the member 101, and consequently the baffle 98 supported from it, are free to rotate within the instrument casing around the vertical axis AA' of the gyroscope. Both parts 99 and 100 of the baffle 98 are supported from the annular member 101 by a number of spaced vertical blades 108 lying in radial planes through the vertical axis AA'. The rotatable annular member 101 is also provided with internal teeth 109 meshing with a driving pinion 110 carried on an externally driven shaft 111. This shaft is shown as driven by a repeater motor 92 operated by a remote magnetic compass 90 as in the system of Fig. 1.

In operation, the stream of air issuing from the nozzle 97 strikes the baffle member 98. According to the orientation of this member round the vertical axis AA' relative to the gyroscope part 99 or part 100 of the baffle member 98 is situated in front of the jet and is struck by it. If the baffle member 98 is turned so that part 99 intercepts the jet, the jet is deflected upwards from it, or diverted by it, into a direction lying in the vertical plane through XX' and inclined slightly to the vertical, so as to converge slowly towards the axis XX'. The direction of the deflected jet and the spacing of the part 99 from the segment 94 are such that the deflected jet strikes the upper half of the segment 94 approximately tangentially. The impact of the jet on the segment 94 applies a torque to the rotor-bearing frame 4 about the axis BB' and causes the gyroscope to precess about the vertical axis AA'. The blades 108 are much thinner than the width of the jet from nozzle 97, so that, if the baffle 98 is so oriented that one of these blades is directly in the vertical plane containing the jet, the action of the jet is only partly interrupted.

It will be clear from the above that, if the baffle member 98 be oriented so that part 100 intercepts the jet from nozzle 97, then the jet will be diverted downwards to strike tangentially the lower part of the turbine 94, and a torque will be applied to the rotor-bearing frame about the axis BB' in the reverse sense to that considered above, so that precession of the gyroscope about the vertical axis AA' will be in the opposite direction from before.

Since interception of the jet by any part of the 180° angular extent of part 99 of the baffle 98 will cause the gyroscope to precess in one direction and interception by any part of the 180° angular extent of part 100 of the baffle will cause the gyroscope to precess in the other direction, it follows that there is only one position of rest for the gyroscope, which is when the nozzle 97 is opposite one of the two junctions between parts 99 and 100. In this position one half of the jet is intercepted by part 99 and deflected upwards and the other half is deflected downwards, the two halves applying equal and opposite torques to the turbine 94.

Figure 8:
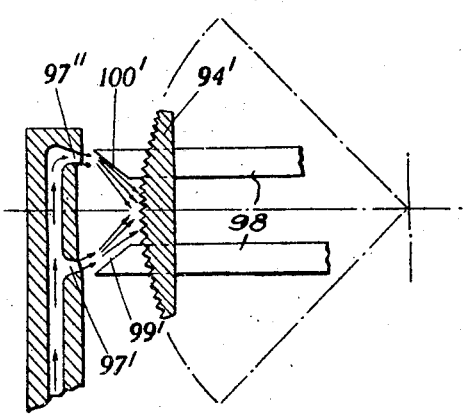
Fig. 8 is a diagrammatic illustration of yet another form of deflecting baffle and co-operating nozzle suitable for use in an arrangement otherwise similar to Fig. 4.
Figure 5:
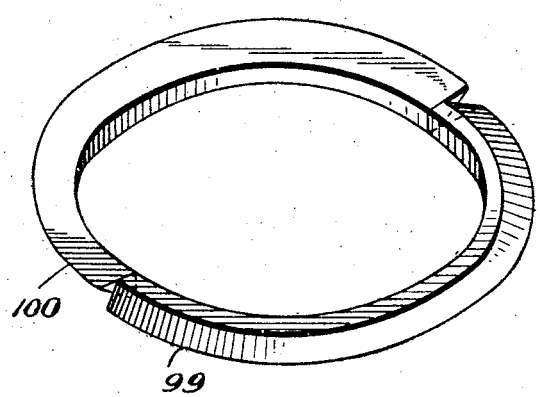
Fig. 5 is a perspective view of the bevel rings used in Figs. 4, 6, and 7.

Fig. 8 shows a modification of the nozzle and baffle arrangements of Figs. 4, 6 and 7. Here two nozzles 97' and 97'', one above the other, are used instead of the nozzle 97, the nozzle 97' being slightly below and the nozzle 97'' being slightly above the level of the axis BB' of tilt of the rotor-bearing frame.

The controlling baffle 98 turns between the segment 94' and the pair of nozzles 97' and 97'', and is operated, and controls the gyroscope, in the same general manner as the baffle 98 of Figs. 4, 6 and 7. There is a semi-circular part 99' adapted to deflect the jet 97' upwards to strike the segment 94' and apply a clockwise torque (as seen in Fig. 8) thereto about the axis BB', and there is a semi-circular part 100' (situated 180° from the part 99') adapted to deflect the jet from nozzle 97'' downwards to strike the segment 94' and apply an anti-clockwise torque (as seen in Fig. 8) thereto about the axis BB'. The jets from nozzles 97' and 97'' are preferably directed to intersect the axis BB', so that, if the baffle parts 99' and 100' do not intercept them, they nevertheless exert no appreciable torque on the gyroscope about this axis.

The modification of Fig. 8 has this advantage over the system of Figs. 4, 6 and 7 that the jets from nozzles 97' and 97'' after deflection from the baffle parts 99' and 100' strike the segment 94' in the vicinity of its centre. In this way the craft and therefore the vertical ring 9 together with the nozzles 97' and 97'' and the deflecting baffle may tilt through larger angles about the axis BB' than in the system of Figs. 4, 6 and 7, without the diverted jet being carried beyond the top or bottom edge of the segment 94' and thus ceasing to exert control torques on the gyroscope.

Instead of using two nozzles on one side of the gyroscope as in Fig. 8 one to apply clockwise torques and the other counter-clockwise torques, two nozzles could be used on opposite sides of the gyroscope, each opposite to a segment section.

Figure 11:
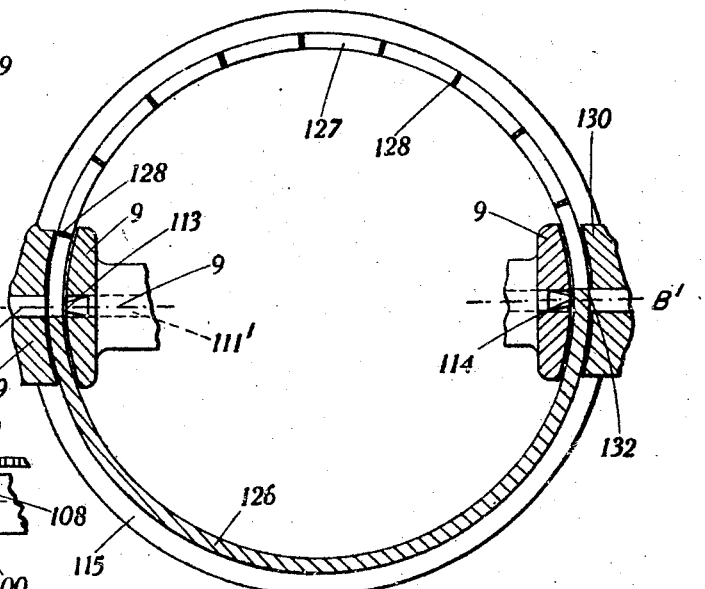
Fig. 11 is a sectional plan view taken on the line 11—11 of Fig. 9 of the nozzle and collector and part of the controlling baffle of the instrument of Fig. 9.

Figs. 9, 10 and 11 illustrate an embodiment of the invention in which the baffle is of the intercepting type, the baffle serving, however, to intercept the flow of air from a nozzle or port into a collecting conduit or chute leading the air to a point where it is discharged against a turbine attached to the rotor case.

In this embodiment of the invention air passages 111', 112 serve to conduct air from the interior space 28 through the lower limb of the vertical ring 113 to ports or nozzles 113, 114. Just outside these nozzles turns the baffle 115. This is in the form of a cylinder having a flange 116 mounted for rotation about the axis AA'. The under side has gear teeth 117 which engage with a driving pinion 118 mounted on a shaft 119. The flange 116 of the baffle is supported by flanged rollers 120, 121, 122 which act as radial-and-thrust bearings in a manner generally similar to the rollers 102, 103 of Fig. 4, except that roller 120 is mounted on shaft 119 instead of on a fixed pivot pin. Additional rollers 123, 124, 125 engage with the upper surface of flange 116.

Fig. 11, being a section of the baffle 115 and nozzle 113, 114 at the level of the nozzle openings, illustrates how the jets from the nozzle are controlled by the baffle as a function of its angular position with respect to the gyroscope. As can be seen in this figure, a cut has been taken through the baffle wall extending through an arc of 180° in the horizontal plane of Fig. 11, so that in this horizontal plane the baffle is represented by a solid wall portion 126 extending through an arc of 180°, and, throughout the portion 127 extending through the remaining 180°, by vacant space except for a number of thin vertical blades 128 extending vertically across the cut in the wall of the baffle. These blades serve partly to stiffen the structure and partly to prevent air leakages as will now be described.

In Figs. 9 and 11 the baffle is shown as turned counterclockwise through a small angle from its normal position relative to the gyroscope which is when the ends of the solid portion 126 coincide with the axis BB'. The result is that the nozzle or port 114 is completely obstructed by the portion 126 of the baffle, whereas the nozzle or port 113 is completely unobstructed. Opposite the nozzles 113, 114 and close to the outside of the cylindrical wall of the baffle 115 are collectors 129, 130 containing collecting ports 131, 132 directly opposite the nozzles 113, 114. The collectors 129, 130 are supported by brackets 133, 134 from the gear 32, which is, of course, solid with the vertical ring 9, so that the collector ports 131, 132 remain invariably opposite the nozzles 113, 114.

The inner face of the collectors 129, 130 and also the outer face of the parts of the vertical ring 9 containing the nozzles 113, 114 are of cylindrical form, coaxial with the axis AA' round which axis they extend for an appreciable angle on both sides of the vertical plane through BB'— far enough, in fact, to extend beyond at least one of the blades 128 in the part 127 of the baffle. As can be seen from Fig. 11, the result is that when the baffle leaves the nozzle 113 uncovered so that air flows therefrom into the collecting port 131, the first vertical blade 128' acts as a seal to prevent appreciable lateral escape of air between the vertical ring 9 and the collector wall 129. For the same reason the spacing between the collector 129 and the baffle 115, and between the baffle and the vertical ring 9, is made small.

The collector ports 131, 132 lead to tubes 135, 136 which terminate in further nozzles 137, 138. These are so directed that air jets issuing from them strike opposite sides of the turbine 139 which is fixed to the rotor-bearing frame 4.

In the position shown in Figs. 9 and 11 the baffle intercepts the air flow from nozzle 114 through the collecting port 132, tube 136 and secondary nozzle 138; however, the air flows freely through nozzle 113, collecting port 131, tube 135 and secondary nozzle 137 to impinge against the turbine wheel 139 and thus apply a torque to the rotor-bearing frame 4 about the axis BB'; the gyroscope therefore precesses about the axis AA'.

The existence of the unbalanced torque applied by the air jet about the axis BB' depends on the fact that nozzle 114 is obstructed by the baffle and that nozzle 113 is not obstructed; clearly, therefore, if the nozzle were turned clockwise as seen in Figs. 10 and 11 through a sufficient angle to obstruct nozzle 113 and to leave port 114 unobstructed, the reverse action would take place, so that the air jet to auxiliary nozzle 138 would apply an unbalanced torque about the axis BB' in the opposite sense from before, with the result that the gyroscope would precess in the opposite direction about the axis AA'. The gyroscope is thus always precessed towards a normal position of alignment with the baffle 115 in which the part 126 of the baffle bisects the air jets from both nozzles 113 and 114. The baffle member 115 is, of course, positioned by the driving pinion 118 carried on shaft 119; this shaft may be operated from a magnetic compass repeater or from a servo-motor controlled by a magnetic compass in the manner already described in connection with other embodiments of the invention.

The system of Figs. 9, 10 and 11 has been described as if the ports 113, 114 were the nozzles supplying air jets for applying torques to the gyroscope to cause it to precess, and as if the collectors 129 and 130 and the tubes 135 and 136 were merely passages leading the air that the baffle allowed to pass to auxiliary nozzles from which it is discharged against the turbine 139. Alternatively, the invention can be described as if nozzles 137, 138 were the nozzles from which air jets issue to apply the torque to the gyroscope and as if the baffle 115 acts to control the supply of air through passages leading to these nozzles.

In cases where the baffle is controlled by a magnetic compass repeater such as the repeater 92 of Fig. 1, this repeater may be of the self-synchronous type which turns through one revolution for every revolution of the magnetic compass. In that case, the controlling member carrying the baffle—which also is arranged to turn through one revolution for every revolution of the magnetic compass relative to the craft—will turn 1:1 with the magnetic compass repeater. However, if the repeater 92 does not turn 1:1 with the magnetic compass the controlling member carrying the baffle will not be geared 1:1 with the repeater compass and it may then become desirable to provide an indicator to indicate to what angle the controlling member is set so that it may be initially "synchronised" with the magnetic compass. Such an indicator may be mounted in any position visible in the window of the instrument and it may be operated by a train of gearing from the repeater 92. Alternatively, a card may be carried on the controlling member carrying the baffle. This last alternative is shown in Fig. 8; here the baffle carries a card 140 which is visible through a small window 141 in the instrument case. Similar measures may be adopted in other embodiments of the invention.

What we claim is:

1. In a slave directional gyro, the combination with a rotor, a rotor bearing frame in which said rotor is journaled on a normally horizontal spin axis, a vertical ring, pivots pivotally mounting said frame in said ring for oscillation about a second horizontal axis normal to said spin axis, said ring being turnable about a vertical axis, jet means on the vertical ring positioned at a substantial angle to said axis of oscillation, intercepting means on the rotor bearing frame adapted to be engaged by the air from said jet means, baffle means rotatably mounted coaxially with said vertical ring and adapted in the normal position to cause the air from said jet means to exert equal and opposite torques on the rotor bearing frame, but to exert an unbalanced torque in one direction or the other upon relative turning of said baffle and vertical ring, a repeater compass adapted to be positioned in azimuth from a remote magnetic compass or the like, and connecting means from said repeater compass to said baffle for orienting the same about said vertical axis.

2. Gyroscopic apparatus as claimed in claim 1, wherein said jet means is rotatable with said vertical ring and said baffle has a pair of deflecting surfaces, one of which deflects the air downwardly and the other upwardly onto said bearing frame, said baffle surfaces extending around the bearing frame in opposite directions and terminating adjacent one another, whereby relative change of orientation of said baffles and vertical ring causes an unbalanced torque on the bearing frame in one direction or the other.

3. Gyroscopic apparatus as claimed in claim 1, wherein said jet means comprises a plurality of nozzles rotatable with said vertical ring and said baffle means comprises a cut-off plate between the jets issuing from said nozzles and said frame and adapted in the normal position to cause said nozzles to exert equal and opposite torques on said frame, but upon relative displacement of said baffle and nozzles to cause said nozzles to exert unbalanced torques about the horizontal axis of said frame.

4. In a slave directional gyro, the combination with a rotor, a rotor bearing frame in which said rotor is journaled on a normally horizontal spin axis, a vertical ring, pivots pivotally mounting said frame in said ring for oscillation about a second horizontal axis normal to said spin axis, said ring being turnable about a vertical axis, two jet pipes on the vertical ring positioned to direct opposing jets at a substantial angle to said axis of oscillation, intercepting means on the rotor bearing frame adapted to be engaged by said jets from said jet pipes, rotatable cut off means interposed within said pipes adapted in the normal position to permit equal supply of air to said two pipes but to differentially intercept the supply of air to said pipes upon relative turning of said baffle and vertical ring, whereby an unbalanced torque is created around the horizontal axis of said frame, and a repeater compass adapted to be turned from a magnetic compass or the like for orienting said intercepting means, whereby said gyroscope follows said magnetic compass in azimuth.

5. In a slave directional gyro, the combination with a rotor, a rotor bearing frame in which said rotor is journaled on a normally horizontal spin axis, a vertical ring, pivots pivotally mounting said frame in said ring for oscillation about a second horizontal axis normal to said spin axis, said ring being turnable about a vertical axis, a single nozzle turnable with said vertical ring, and a baffle between said nozzle and frame, said baffle being also mounted for turning about said vertical axis and having a pair of deflecting surfaces, one of which deflects the air downwardly and the other upwardly onto said bearing frame, said baffle surfaces extending around the gyroscope in opposite directions, whereby change in relative orientation of said baffle and vertical ring causes an unbalanced torque on the rotor bearing frame in one direction or the other.

6. In a slave directional gyro, the combination with a rotor, a rotor bearing frame in which said rotor is journaled on a normally horizontal spin axis, a vertical ring, pivots pivotally mounting said frame in said ring for oscillation about a second horizontal axis normal to said spin axis, said ring being turnable about a vertical axis, jet means on the vertical ring positioned at a substantial angle to said axis of oscillation, and adapted to direct an air stream against the rotor bearing frame, a pair of complementary semi-circular rings around said gyroscope located between said jet means and said frame, common means for rotatably mounting said rings about said vertical axis, one of said rings having a downwardly inclined surface and the other an upwardly inclined surface, one or the other of said surfaces being adapted to lie in the path of said air stream to deflect the same upwardly or downwardly whereby relative change of orientation of said rings and gyro causes an unbalanced torque on the rotor bearing frame in one direction or the other.

ROBERT HAYES NISBET.
WILLIAM GEORGE HARDING.